INVENTORS
Roy F. LoPresti
BY   Jerome C. Salmons

ATTORNEY

Dec. 28, 1965     R. F. LO PRESTI ETAL     3,225,899
ROPE FRAME CONVEYOR WITH CONTROLLED BELT DEFLECTION
Original Filed July 13, 1955     3 Sheets-Sheet 3

INVENTORS
Roy F. LoPresti
BY  Jerome C. Salmons

ATTORNEY

United States Patent Office 3,225,899
Patented Dec. 28, 1965

3,225,899
ROPE FRAME CONVEYOR WITH CONTROLLED
BELT DEFLECTION
Roy F. Lo Presti, Chicago, Ill., and Jerome C. Salmons, Baltimore, Md., assignors to Goodman Manufacturing Company, Chicago, Ill., a corporation of Illinois
Continuation of application Ser. No. 521,772, July 13, 1955. This application Jan. 2, 1959, Ser. No. 785,109
5 Claims. (Cl. 198—192)

This is a continuation of applicants' co-pending application Serial No. 521,772 filed July 13, 1955, now abandoned.

This invention relates generally to endless conveyors and more particularly to an improved strand or rope sideframe conveyor in which the deflection of the conveyor belt is controlled and limited to a predetermined amount, yet still providing the elasticity and impact absorbing ability which is characteristic of rope sideframe conveyors.

In a rope sideframe conveyor, a pair of flexible strands such as wire ropes is trained along a course and suitably tensioned. The ropes have suspended across them a series of troughing assemblies along which the load-carrying reach of the conveyor belt runs. A return reach runs beneath the troughing assemblies. The ropes are generally supported at intervals in order to control their gravity-induced catenary sag and their spacing. By way of example, but not by way of limitation, types of rope sideframe conveyors in which the present invention may be advantageuosly employed are shown in Craggs and McCann Patent No. 2,773,257 issued December 4, 1956; and Lo Presti and Madeira application, Serial No. 523,438 filed July 1, 1955, now Patent number 2,875,886.

One of the advantages of rope sideframe conveyors is their ability to absorb high impact loads by deflecting the ropes. Additional flexibility and impact absorption may be obtained by using limber troughing assemblies such as described in the above-mentioned Craggs and McCann Patent 2,773,257. The added flexibility provided by these limber troughing assemblies supplements the flexibility of the wire ropes and improves the impact absorbing ability of the belt. Thus, in operation, as an oversize lump of material is carried past a troughing assembly, the wire ropes and the troughing assembly will be simultaneously deflected downward; these deflections progress along the belt, with the lump.

An object of the present invention is to control the flexibility of the ropes so a load will be carried without significant bobbing or wobble.

The prior art, as it was at the time of the present invention, is described in Madeira Patent 2,850,146, which teaches that impact loads can be absorbed by connecting the troughing assemblies to the wire ropes at some distance from the supporting stands.

By our present contribution to this art, we have found that simply absorbing the impact is not enough to realize the full potential of a rope sideframe conveyor. In addition, the load must be tranquilized, that is, the belt must be supported so the load will not bob up and down or wobble from side to side, for either of these motions creates spillage and wastes power.

We have found it essential that, not only should the roller assemblies be spaced some distance from the wire rope support means, but the distance between adjacent sets of support means and roller assemblies should be substantially uniform along the length of the belt; otherwise, the load on the belt will pitch up and down instead of traveling level.

Accordingly, a specific object of this invention is to control the flexing of the ropes at the troughing assembly connections so each deflects the same amount under the same load. This is accomplished by providing supporting means for the ropes at intervals along their lengths effective to support them at a given height or to support them at a given spacing, or both, as required by the type of rope sideframe conveyor employed, and mounting all the troughing roller assemblies at substantially identical distances from the supporting means.

Since the supporting means may be of the above mentioned two classes, or a combination of both, the problem can be broken down into two parts. First, enabling the load to ride level from one end of the conveyor to the other, this part of the problem being common to both types of rope sideframe conveyors shown in Patents 2,773,257 and 2,875,886. And, second, enabling a load, riding at the edge of the belt, to travel in a straight line, this part of the problem being found in the type of conveyor shown in Patent 2,773,257 where the ends of the flexible troughing rollers are free to flex toward and away from one another with flexing of the ropes.

Since both parts of the problem solved by this invention exist in the "full flexible" type of conveyor using flexible roller assemblies, that type is illustrated in the drawings. It should be clearly understood, however, that the invention may be applied to other types of rope sideframe conveyors.

Now, with respect to the "full flexible" rope sideframe conveyor illustrated, in which flexible roller assemblies are connected directly to flexible strands, it is possible to have too much flexibility, for an excessively heavy lump or load may deflect the troughing rollers downward and pull the rope framing elements inward to the extent that the edges of the belt are opening and closing excessively. Therefore, it has been found necessary to provide relatively rigid spacers at intervals between the wire ropes to prevent them from being pulled together too closely.

Prior to the present invention, rope frame conveyors have been constructed with rope supporting stands or jacks placed as far apart as practical with at least three and sometimes as many as six troughing roller assemblies located between adjacent stands. The ropes have been allowed to sag in shallow, catenary-like curves or waves between the supporting stands, and very high rope tensions have been required to limit the sag to a practical value at the mid points of the spans. When the tension in the ropes was maintained at these high values they became stiff, especially in the area of the supporting stands, and the inherent shock absorbing ability of the flexible rope frame was greatly reduced. As the belt became loaded, the idler assemblies would deflect, in greater amounts at greater distances from the supporting stands, deflecting the ropes more at the centers of these spans. Therefore, with three or more roller assemblies between the supporting stands, the deflection of the ropes under a given load would not be equal at any two adjacent idler assemblies, being greatest at those assemblies near the middle of the spans and least at those assemblies connected to the relatively stiff portion of the ropes near the supporting stands. With the "full flexible" type of rope sideframe conveyor, this condition was exaggerated and caused the roller assemblies to trough unevenly and to flex the edges of the belt, creating internal belt friction and disturbing the load on the belt; further, this condition required more power from the belt drive, and at times would cause the belt to spill part of the load riding near the edge.

A primary object of this invention is to provide a flexible rope frame conveyor in which the vertical deflection of the ropes at each troughing assembly under a given load will be equal; ancillary to this, where flexible troughing assemblies are used, it is an object to provide substantially identical troughing of troughing assemblies under the same load.

Another object is to provide a flexible rope frame conveyor in which the rope tension may be maintained at a relatively low value, thereby increasing the flexibility of the ropes and improving the shock and impact absorbing qualities of the conveyor so that it is possible to use lighter weight rollers and belting.

Another object is to provide a flexible, rope frame conveyor in which the loads on the rope supporting and spacing stands are greatly reduced, permitting the supports to be made relatively light in weight.

Other objects and advantages of this invention will be apparent from the following description in connection with the appended drawings in which.

Figure 1:
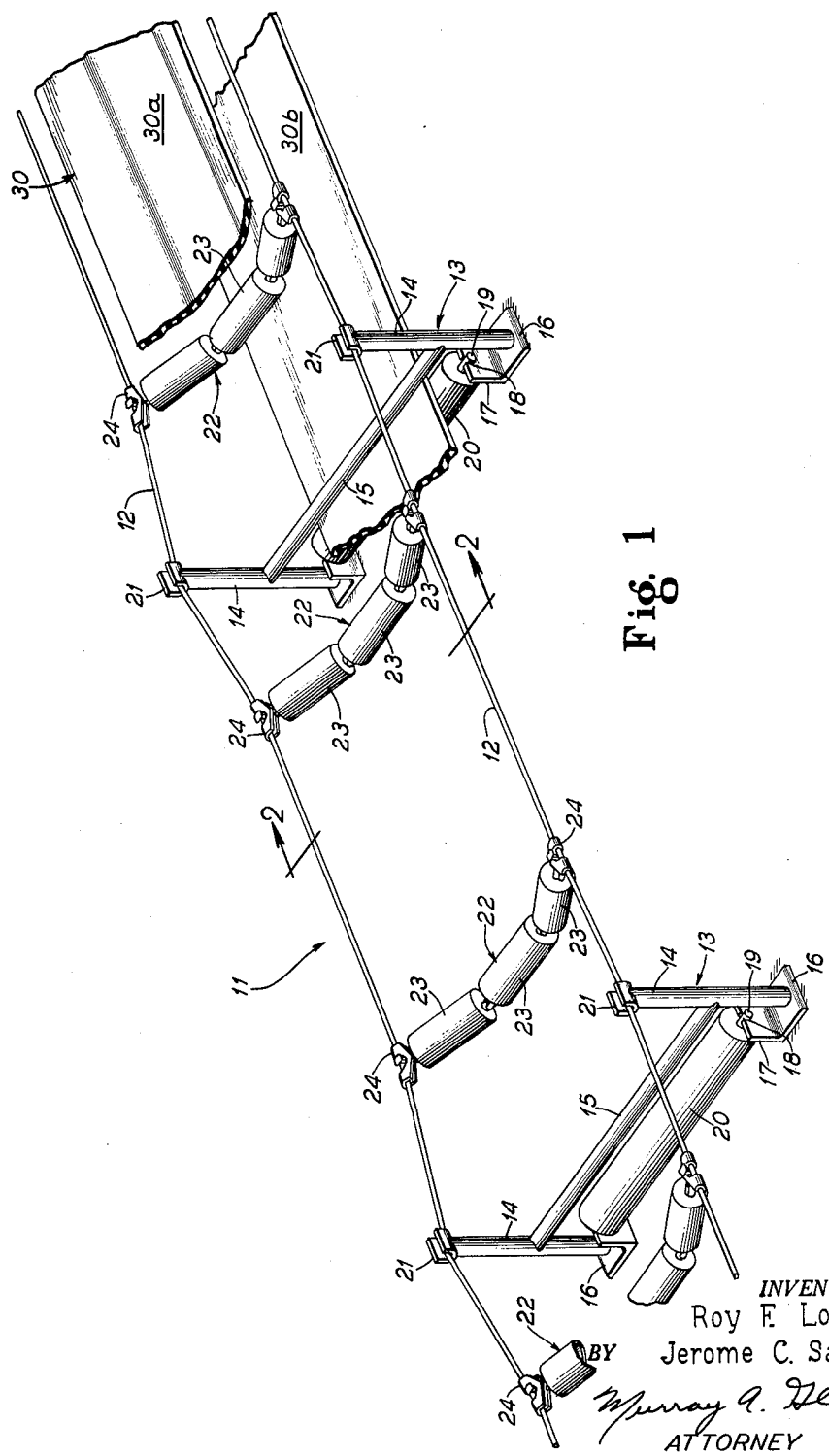
FIGURE 1 is a fragmentary perspective view of one preferred form of full flexible rope sideframe conveyor in accordance with the present invention.
Figure 2:
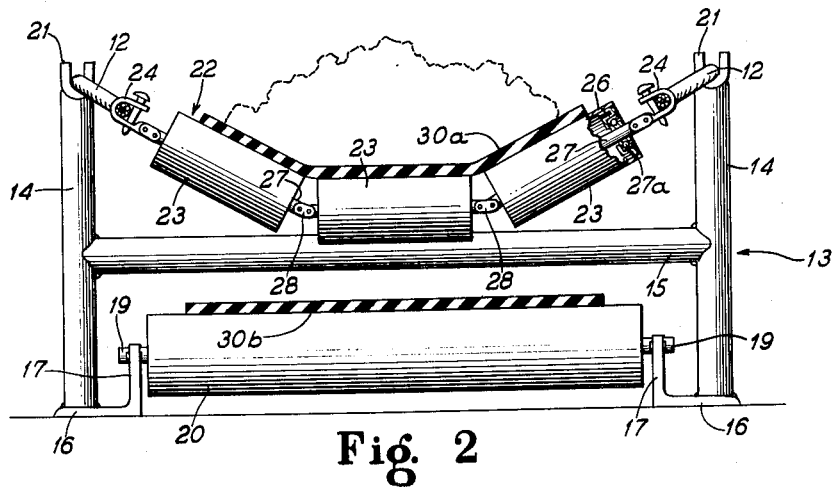
FIGURE 2 is a cross sectional view of FIGURE 1 taken along the line 2—2.
Figure 3:
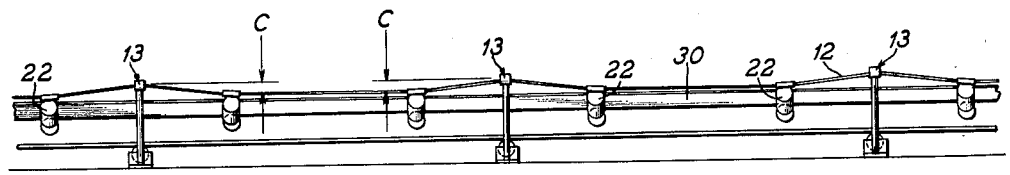
FIGURE 3 is a side view of FIGURE 1.

Referring first to the embodiment shown in FIGURES 1 through 4, the belt conveyor generally designated 11 may be used for example in underground mines and has a flexible frame comprising a pair of flexible strands or wire ropes 12, 12 supported from the ground and spaced from each other at substantially regular intervals by supporting stand means 13. Each of the latter consists of a pair of upstanding vertical side members or legs 14, 14 held rigidly spaced apart by a horizontal spacer bar 15. A foot 16, comprising a section of angle iron, is welded to the bottom of each leg and its inwardly projecting, upwardly turned flanged portion 17 is notched as at 18 to receive and hold the end of a return roller shaft 19 having a roller 20 journaled thereon. A short, upwardly open, U-shaped trough section 21 is welded to the top of each leg in a position to receive and support one of the longitudinally extending ropes 12, 12. Any suitable tensioning means for the ropes may be provided such as, for example, turnbuckles pulling against jacks anchored between the roof and floor where the conveyor is employed in an underground mine (not shown).

The ropes 12, 12 support flexible troughing roller assemblies 22 which are suspended between and at right angles to the ropes. The roller assemblies are flexible, being articulated for up and down adjustable movement relative to one another. Each roller assembly consists of a plurality (in this particular case, three) of pivotally interconnected idler rollers 23 and a pair of end clamps or brackets 24, 24. Each roller 23 is comprised of an outer shell 26 journaled for rotation about a non-rotatable shaft 27. A suitable roller or ball bearing 27a may be provided at each end of each roller 23, acting between the shaft and the shell. The center roller is connected to the outer or wing rollers by means of pivotal chain connecting links 28, the pins of which pass through holes drilled in the ends of the shaft 27. The wing rollers are connected to the rope brackets 24 in the same manner. All of the connecting links are arranged with their pin axes longitudinal of the conveyor so the roller assembly will be flexible in a vertical plane.

The roller assemblies 22 support the upper reach or run 30a of a belt 30 and the lower or return run 30b is supported on flat rollers or idlers 20 rotatably journaled on the above-mentioned idler shafts 19.

Figure 4:
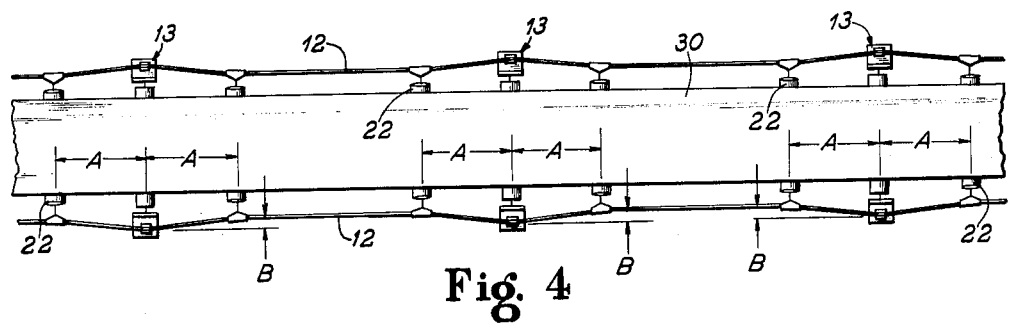
FIGURE 4 is a plan view of FIGURE 1.

In the FIGURE 1–4 embodiment, two roller assemblies are located between adjacent supporting means 13, each roller assembly being spaced equidistantly from an adjacent stand 13 so that the flexibility and deflection of the ropes at these points will be equal. Here, the spacer stands 13 serve the dual function of spacers holding the wire ropes a predetermined distance apart and stands supporting them above the floor to control the catenary droop. The plan view in FIGURE 4 illustrates the roller assemblies 22 being spaced a like amount "A" away from each adjacent spacer 13, both in "upstream" and "downstream" directions. Thus it will be seen that the "pull-in" B is the same at each roller assembly. Likewise, referring to FIGURE 3, the catenary droop or sag C in the cable is the same at each roller assembly. Therefore, the troughing of the roller assemblies and the belt will be uniform along the entire length of the conveyor, as illustrated by the straight, parallel edges of the belt in FIGURE 4. By maintaining the same amount of troughing for all roller assemblies and the same amount of sag and "pull-in" for the ropes at the points where these assemblies are located, the center rollers will be maintained in the same horizontal plane (except for normal bobbing up and down to absorb impact and load variations) thereby providing a smooth, even support for the conveying reach of the belt.

It will be apparent that the sag and "pull-in" of the ropes may be varied at all roller assembly connecting points simultaneously by changing the tension in the ropes. Since the sag and "pull-in" do not need to be small in this conveyor construction, high rope tensions are not required. Smaller and more flexible ropes may be used, and much less strength is required in the anchoring and tensioning means (not shown) at the ends of the ropes.

It will be obvious that the shock absorbing qualities of all the flexible roller assemblies will be equal since the supporting ropes are equally flexible at every point of attachment. And, since low values of rope tension do not introduce waves and unequal troughing into the load-carrying run of the belt, the flexibility and therefore the shock and impact absorbing ability of the conveyor frame will be greatly increased over those constructions in which high values of rope tension are required to limit the sag and "pull-in" between the rope supporting and spacing means.

While the drawings illustrate constructions in which there is exact symmetry in spacing the members 13 apart and in spacing the roller assemblies 22 the same distance away from them, it should be understood that, in practice, such exact spacing would seldom be realized for, in assembling the conveyor, the distances between the spacers 13 and roller assemblies 22 will be measured by eye and not by tape and hence there will be minor variations between them all. Because such minor variations may actually be beneficial, in preventing harmonic vibrations, the workmen may sometimes be instructed to install them by eye rather than by actual measurement. By eliminating the need for extremely accurately measuring of the spacings, the conveyor set-up time is reduced.

Figure 5:
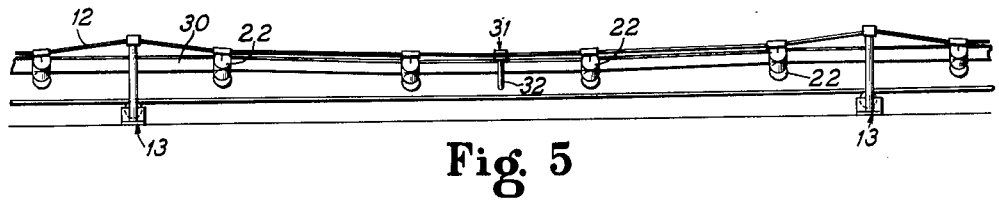
FIGURE 5 is a side view, similar to FIGURE 3, but of a modified form of the invention.
Figure 6:
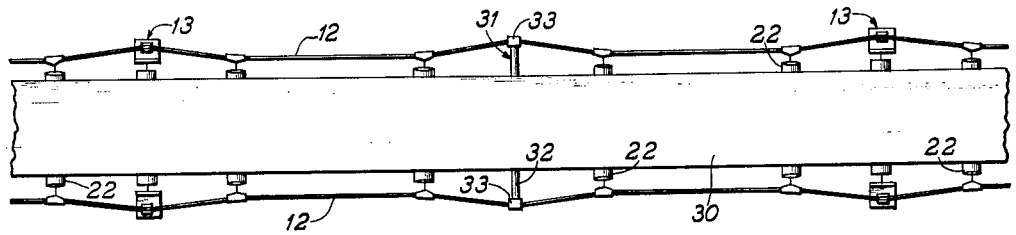
FIGURE 6 is a plan view of FIGURE 5.

The embodiment shown in FIGURES 1–4 employ spacers 13, all of which are ground-engaging. By contrast, FIGURE 5 illustrates a modified form of the invention in which alternate of the supporting means 13 are replaced by non-ground-engaging spreader support means 31, each shown as comprising a curved tube 32 fitting within the space between the upper and lower runs of the belt, and outwardly-open, U-shaped, rope-engaging saddles 33, 33 affixed thereto as by welding. The ropes are permitted to sag in catenary-like curves between spacing stands 13, 13, as shown in FIGURE 5, and the spacers 31 at the mid points of the spans prevent the "pull-in" of the ropes from varying at the points of attachment of the idler assemblies, thereby maintaining equal troughing of the idlers throughout the length of the conveyor. This modified construction has been found preferable in underground coal mines where the advantage of minimum weight and material handling has more than offset the slight disadvantage of introducing some catenary-like waves into the belt movement. And, as described in connection with the FIGURE 1–4 embodiment, harmonic motion, if and where it is likely to occur, may be readily controlled and prevented by setting the roller assemblies and spacers and supporting stands just slightly off from the theoretical equidistant arrangements shown in the drawings.

While the invention has been described in terms of the preferred embodiments shown, its scope is intended to be defined only by the appended claims. For example, while the invention has been described in connection with a conveyor having flexible troughing roller assemblies, other types of troughing assemblies may be employed in practising the invention within the scope of the claims.

We claim:

1. In a belt conveyor, a pair of flexible strands trained along generally parallel courses, two elongated troughing roller assemblies suspended at intervals along said strands and between said strands at portions of said strands which are relatively freely movable toward and away from one another, each of said troughing roller assemblies being transversely flexible across its own length in a direction to move the ends thereof toward and away from one another, a belt having a load-carrying reach supported for movement along said roller assemblies and a return reach beneath said roller assemblies, and a strand spacing means separate from said troughing roller assemblies suspended between the strands intermediate the portions of the strands where the roller assemblies are connected and extending between the belt reaches, said strand spacing means being wholly supported by said strands for movement up and down therewith with load variations on the belt.

2. In a belt conveyor, the combination of claim 1 in which the strands are provided with supporting means to control the gravity-induced catenary droop therein.

3. In a belt conveyor, the combination of claim 1 in which said troughing roller assemblies are located at substantially equal distances along said strands on opposite sides of each of said strand spacing means.

4. In a belt conveyor, a pair of flexible strands trained along generally parallel courses; support means for said strands spaced at intervals along said strands and effectively restraining relative transverse movement of said strands in a direction toward one another at said support means while permitting relative transverse movement of portions of said strands in directions toward and away from one another remote from said support means; a plurality of elongated troughing means each being transversely flexible across its own length in a direction to move the ends thereof toward and away from one another and extending transversely across said strands with the ends of said troughing means being connected respectively to said strands at said relatively movable strand portions; the combination hereinbefore recited wherein only two and no more than two troughing means are supported on said strands between adjacent support means, some of said support means being ground supported and some being wholly supported on said strand means.

5. In a belt conveyor, a pair of flexible strands trained along generally parallel courses; support means for said strands spaced at intervals along said strands and effectively restraining relative transverse movement of said strands in a direction toward one another at said support means while permitting relative transverse movement of portions of said strands in directions toward and way from one another remote from said support means; a plurality of elongated troughing means each being transversely flexible across its own length in a direction to move the ends thereof toward and away from one another and extending transversely across said strands with the ends of said troughing means being connected respectively to said strands at said relatively movable strand portions, a conveyor belt having a load-carrying reach movable along said troughing means and having a return reach at a different level: the combination hereinbefore recited whereby only two and no more than two troughing means are supported on said strands between adjacent support means, alternate of said support means being supported on said strands and extending between said load-carrying and return reaches of the belt.

References Cited by the Examiner

UNITED STATES PATENTS

| 909,833 | 1/1909 | Vrooman | 198—192 |
| 1,412,575 | 4/1922 | Sessoms | 104—115 X |
| 1,748,301 | 2/1930 | McKinlay | 198—129 |
| 2,179,187 | 11/1939 | Kendall | 198—192 |
| 2,773,257 | 12/1956 | Craggs et al. | 198—184 X |
| 2,850,146 | 9/1958 | Madeira | 198—192 X |

FOREIGN PATENTS

| 53,825 | 9/1890 | Germany. |

SAMUEL F. COLEMAN, *Primary Examiner.*

HUGO O. SCHULZ, ERNEST A. FALLER, JULIUS E. WEST, SAMUEL LEVINE, *Examiners.*